June 30, 1953 W. L. KUHNS 2,643,454
DEHORNING DEVICE
Filed Aug. 22, 1949
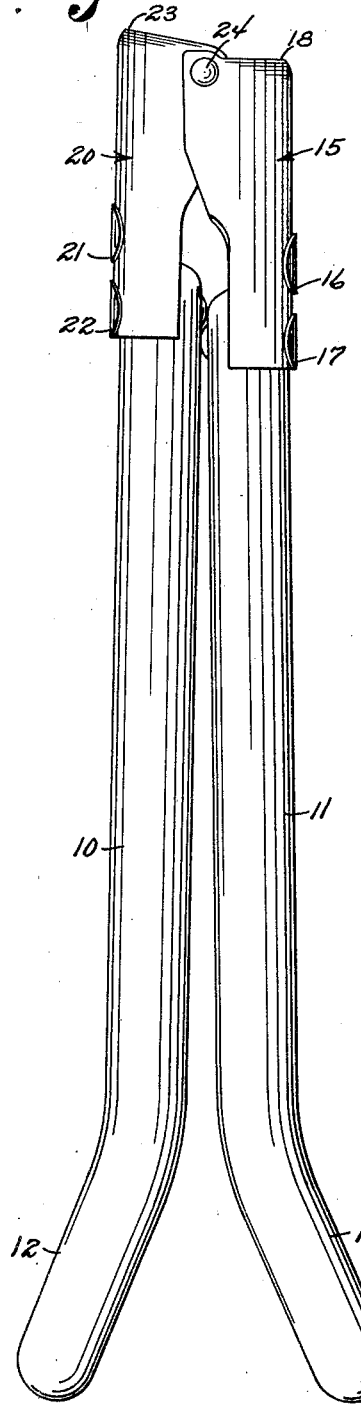
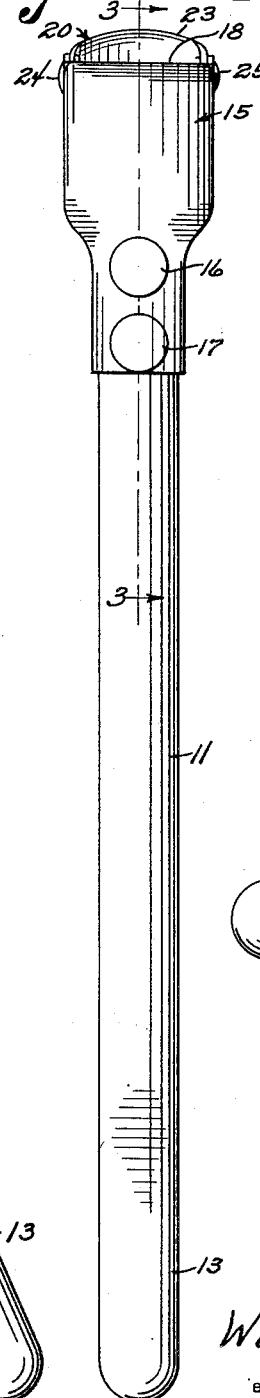
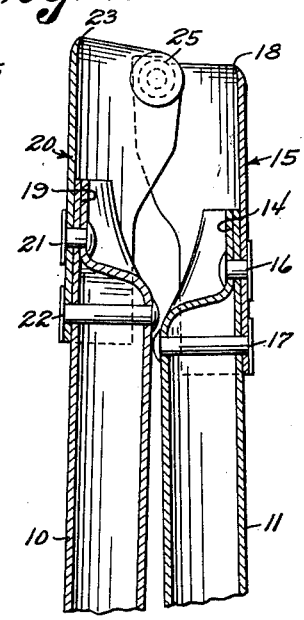
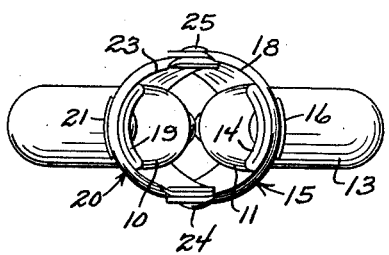
INVENTOR.
William L. Kuhns
BY Victor J. Evans & Co.
ATTORNEYS Patented June 30, 1953

2,643,454

UNITED STATES PATENT OFFICE 2,643,454

DEHORNING DEVICE

William L. Kuhns, Clayton, N. Mex.

Application August 22, 1949, Serial No. 111,702

1 Claim. (Cl. 30—253)

This invention relates to a dehorning device, and more particularly to a device for dehorning young cattle or calves.

The object of the invention is to provide a manually operable cutting device whereby the horns of young cattle or calves can be amputated quickly, readily and with as little pain as possible.

Another object of the invention is to provide a device which will enable the user to dehorn cattle in a neater and more uniform manner than is possible with any dehorning devices now used, since in the present invention one jaw of the dehorner is considerably longer than the other, thus resulting in a circular cut of the head and giving the head the appearance of a natural muley.

A further object of the invention is to provide a dehorning device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a plan view of the dehorning device, according to the present invention;

Figure 2 is a side elevational view of the dehorning device;

Figure 3 is a sectional view taken on the line 3—3 of Figure 2;

Figure 4 is an end elevational view of the dehorning device.

Referring in detail to the drawings, the numerals 10 and 11 designate a pair of handles which are preferably fabricated of hollow tubular steel pipe. The handle 10 is provided with a bent portion 12 and the other handle 11 has a similarly bent portion 13, the bent portions 12 and 13 adapted to be gripped in the user's hand when the horns are being cut from the cattle.

The other end of the handle 11 is provided with a flattened portion 14, and arranged adjacent this flat portion is an arcuate blade member 15. A plurality of suitable securing elements, such as rivets 16 and 17 serve to secure the blade member 15 to the handle 11. The blade member 15 is provided with a sharp bevel cutting edge 18 thereon for a purpose to be later described.

The other handle 10 is provided with a flattened portion 19 adjacent one end thereof, and arranged adjacent this end is an arcuate blade member 20. Suitable securing elements, such as rivets 21 and 22 serve to secure the blade member 20 to the handle 10. The blade member 20 is provided with a bevelled cutting edge 23 which coacts with the cutting edge 18 to shear therebetween the horn from the calf or cattle. It is to be noted that the free end of the blade member 20 projects beyond the free or outer end of the blade member 15 so that a neater and more uniform dehorning operation can be accomplished.

A pair of pins 24 and 25 pivotally connect the blade member 20 to the blade member 15.

In use, the handles 10 and 11 are normally arranged in the position shown in the drawings, and to operate the dehorning device, the blade members 20 and 15 are passed down over the horn to be amputated. Then, the handles 10 and 11 are grasped and pulled apart, thus causing the blade members 20 and 15 to pivot about the pins 24 and 25 so that the edges 23 and 18 cut or shear the horn from the animal. Due to the cutting edge of the blade member 20 projecting beyond the cutting edge of the blade member 15, the horn can be amputated uniformly and neatly. In other words, by using the device of the present invention it is possible to make "muleys" which have a natural appearance. Further, since the handles 10 and 11 are fabricated of tubular steel, the handles will not break or become damaged during use thereof. Since one jaw of the dehorning device is substantially longer than the other, the user can obtain the muley effect. By having one jaw of the dehorner considerably longer than the other, a circular cut is provided, thus giving the head the appearance of a natural muley.

What I claim is:

In a device for dehorning calves and cutting curved recesses in the bony ridge at the base of the horns, a pair of handles, an arcuate blade fixed to and extending forwardly from each handle, and a pair of opposed pins pivotally connecting the blades with forward portions of one blade in overlapping relation to the other blade, said blades having their outer edges sharpened, one of said blades having its cutting edge located in a plane normal to the axis of the blades and said other blade having its cutting edge located in a plane inclined forwardly and outwardly with relation to said axis, the inclination of the cutting edge of said other blade causing the cutting edge of said one blade to move when said blades are being closed in a greater arc than said cutting edge of said one blade whereby to form said recesses during the dehorning operation.

WILLIAM L. KUHNS.

References Cited in the file of this patent

UNITED STATES PATENTS

| Number | Name | Date |
|---|---|---|
| 441,065 | Green | Nov. 18, 1890 |
| 1,994,864 | Nisbet | Mar. 19, 1935 |